(12) United States Patent
Kato (10) Patent No.: US 7,729,358 B2
(45) Date of Patent: *Jun. 1, 2010

(54) TRANSCODING APPARATUS, METHOD AND MEDIUM

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 540 days.

This patent is subject to a terminal disclaimer.

(21) Appl. No.: 11/454,085

(22) Filed: Jun. 16, 2006

(65) Prior Publication Data

US 2006/0233196 A1      Oct. 19, 2006

Related U.S. Application Data

(63) Continuation of application No. 09/763,760, filed as application No. PCT/JP00/04375 on Jun. 30, 2000, now Pat. No. 7,088,725.

(30) Foreign Application Priority Data

Jun. 30, 1999      (JP)      ................... 11-184681

(51) Int. Cl.
   *H04J 3/24*      (2006.01)
   *H04N 7/12*      (2006.01)
   *H04N 11/02*     (2006.01)
(52) U.S. Cl. ................... 370/395.64; 370/465; 370/535; 348/423.1; 348/425.1; 375/240.26
(58) Field of Classification Search ............ 370/395.64, 370/465, 535; 348/423.1, 425.1; 375/240.26
See application file for complete search history.

(56) References Cited

U.S. PATENT DOCUMENTS 5,541,852 A  *  7/1996  Eyuboglu et al. ........... 709/232

(Continued)

FOREIGN PATENT DOCUMENTS

DE        198 11 292 A1       9/1998

(Continued)

OTHER PUBLICATIONS

Suresh Gopalakrishnan et al., "Realtime MPEG System Stream Transcoder for Heterogenous Networks," CCRL, 'Online!, Mar. 16, 1999, pp. 1-15, XP002327561, <http://www.research.rutgers.edu/ <\{gsuresh/transcoder/>.

(Continued)

*Primary Examiner*—Alpus H Hsu
(74) *Attorney, Agent, or Firm*—Oblon, Spivak, McClelland, Maier & Neustadt, L.L.P.

(57)  ABSTRACT

A transcoding apparatus and associated methodology of transcoding a first video stream into a second video stream, is provided. A separator extracts a video transport stream packet including the first video stream, a non-video transport stream packet, and timing information from a first transport stream. The timing information indicates a time at which the non-video transport stream packet is formed and the first transport stream relative to the video transport stream packet. A memory is provided to store the timing information. A conversion unit generates the second video stream based on the first video stream. A multiplexer multiplexes a converted video transport stream packed including the second video stream and a converted non-video transport stream packet based on the stored timing information to generate a second transport stream, including the second video stream.

10 Claims, 9 Drawing Sheets

U.S. PATENT DOCUMENTS

| | | | |
|---|---|---|---|
| 5,640,388 A | 6/1997 | Woodhead et al. | |
| 5,691,986 A | 11/1997 | Pearlstein | |
| 5,742,361 A | 4/1998 | Nakase et al. | |
| 5,801,781 A | 9/1998 | Hiroshima et al. | |
| 5,917,830 A * | 6/1999 | Chen et al. | 370/487 |
| 6,041,068 A | 3/2000 | Rosengren et al. | |
| 6,081,295 A * | 6/2000 | Adolph et al. | 375/240.03 |
| 6,091,769 A * | 7/2000 | Moon | 375/240 |
| 6,101,195 A * | 8/2000 | Lyons et al. | 370/498 |
| 6,172,988 B1 | 1/2001 | Tiernan et al. | |
| 6,226,328 B1 | 5/2001 | Assuncao | |
| 6,233,253 B1 | 5/2001 | Settle et al. | |
| 6,275,536 B1 | 8/2001 | Chen et al. | |
| 6,477,706 B1 | 11/2002 | Hua et al. | |
| 6,483,543 B1 * | 11/2002 | Zhang et al. | 348/390.1 |
| 6,493,386 B1 * | 12/2002 | Vetro et al. | 375/240.1 |
| 6,542,518 B1 | 4/2003 | Miyazawa | |
| 6,654,421 B2 | 11/2003 | Hanamura et al. | |
| 6,741,617 B2 | 5/2004 | Rosengren et al. | |
| 6,748,020 B1 * | 6/2004 | Eifrig et al. | 375/240.26 |
| 6,763,522 B1 * | 7/2004 | Kondo et al. | 725/39 |
| 6,788,710 B1 | 9/2004 | Knutson et al. | |
| 6,801,544 B1 * | 10/2004 | Rijckaert et al. | 370/473 |
| 6,873,629 B2 | 3/2005 | Morris | |
| 6,901,078 B2 | 5/2005 | Morris | |
| 6,925,501 B2 * | 8/2005 | Wang et al. | 709/231 |
| 6,937,618 B1 * | 8/2005 | Noda et al. | 370/486 |
| 6,970,472 B2 * | 11/2005 | Kikuchi | 370/395.64 |
| 6,973,258 B1 * | 12/2005 | Yoo et al. | 386/111 |
| 7,016,337 B1 * | 3/2006 | Wu et al. | 370/352 |
| 7,023,925 B1 * | 4/2006 | Ward | 375/240.26 |
| 7,046,910 B2 * | 5/2006 | Chen et al. | 386/68 |
| 7,068,719 B2 * | 6/2006 | Liu et al. | 375/240.12 |
| 2001/0055322 A1 * | 12/2001 | Domon | 370/537 |

FOREIGN PATENT DOCUMENTS

| | | |
|---|---|---|
| EP | 0 673 167 | 9/1995 |
| JP | 8-23539 | 1/1996 |
| JP | 10-51769 | 2/1998 |
| JP | 11-074880 | 3/1999 |
| JP | 11-088314 | 3/1999 |
| JP | 11-112454 | 4/1999 |
| JP | 11-285002 | 10/1999 |
| JP | 2000-244872 | 9/2000 |

OTHER PUBLICATIONS

U.S. Appl. No. 11/453,998, filed Jun. 16, 2006, Kato.

* cited by examiner

TRANSCODING APPARATUS, METHOD AND MEDIUM

CROSS REFERENCE TO RELATED APPLICATION

This application is a continuation and claims the benefit of priority under 35 U.S.C. §120 from U.S. application Ser. No. 09/763,760, now U.S. Pat. No. 7,088,725, filed on Feb. 26, 2001 which is a National Stage Application of PCT/JP00/04375 filed on Jun. 30, 2000 and claims the benefit of priority under 35 U.S.C. §119 of Japanese Patent Application No. 11-184681, filed on Jun. 30, 1999.

TECHNICAL FIELD

The present invention relates to a transcoding apparatus, method and medium, and more particularly to a transcoding apparatus, method and medium, for converting codes used in a transport stream having multiplexed therein a video stream, audio stream and other data stream.

BACKGROUND ART

In the satellite digital television broadcasting and the ground-wave digital television broadcasting which is going to start soon, a transport stream (will be referred to simply as "TS" hereinafter) conforming to the MPEG (Moving Pictures coding Experts Group) 2 systems (ISO/IEC 13818-1) (will be referred to as "MPEG-2" hereinafter), is used as the broadcast wave. TS as the broadcast wave has multiplexed therein a video stream, audio stream and other data stream.

Figure 1:
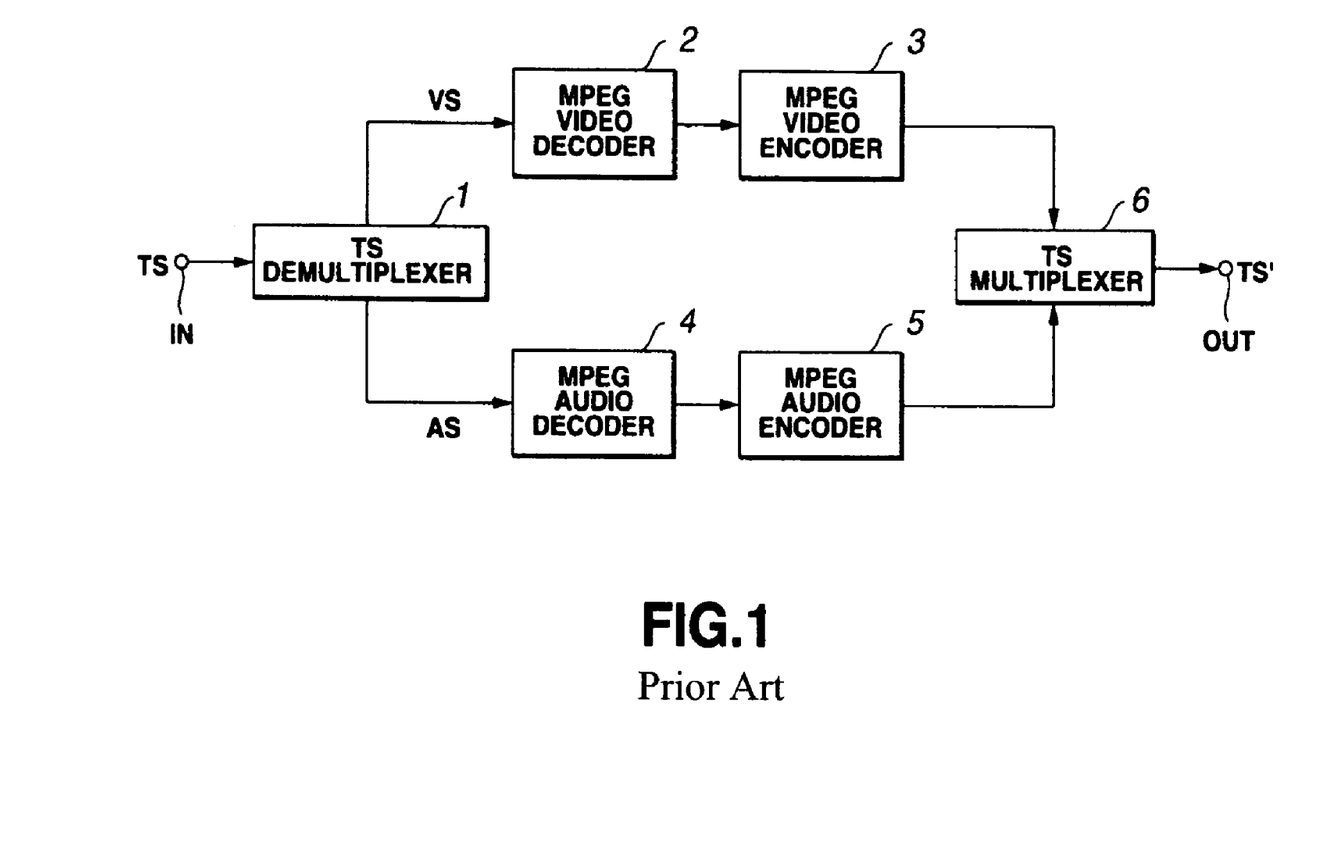
FIG. 1 is a block diagram of a conventional bit rate changer, showing an example of its construction.

When TS as the digital television broadcast wave is recorded into a recording medium, a bit rate changer as shown in FIG. 1 is used to reduce the code bit rate for a to-be-recorded TS if the data recording rate into the recording medium is lower than at a bit rate at which the TS is to be recorded. Note that since the bit rate changer functions to convert the code bit rate, it is a kind of transcoder for converting codes of an input stream.

A TS demultiplexer 1 included in the bit rate changer shown in FIG. 1 separates an input TS via an input terminal IN into a video stream VS and audio stream AS and supplies them to an MPEG video decoder 2 and MPEG audio decoder 4, respectively.

The MPEG video decoder 2 decodes the supplied video stream VS to provide a video signal and supplies the video signal to an MPEG video encoder 3. The MPEG video encoder 3 will encode the supplied video signal to a video stream having a predetermined bit rate by the MPEG method, and supply the encoded video stream to a TS multiplexer 6. On the other hand, the MPEG audio decoder 4 decodes the supplied audio stream AS supplied to provide an audio signal and supplies the audio signal to an MPEG audio encoder 5. The MPEG audio encoder 5 will encode the supplied audio signal to an audio stream having a predetermined bi rate by the MPEG method, and supply the coded audio stream to the TS multiplexer 6. The TS multiplexer 6 will multiplex the video stream supplied from the MPEG video encoder 3 and the audio stream supplied from the MPEG audio encoder 5 to provide a TS' having a reduced bit rate. The TS' is delivered at an output terminal OUT.

However, the conventional bit rate changer shown in FIG. 1 is disadvantageous in that when an input TS contains any elementary streams not conforming to MPEG-2, the TS, once separated into elementary streams, cannot be re-multiplexed. For example, a private stream such as a data stream used in the digital television broadcasting is not conforming to MPEG-2, and each of service providers uniquely sets necessary buffer size and bit rate for multiplexing. No multiplexing is possible when the TS multiplexer 6 does not understand the buffer model for a stream to be multiplexed. Therefore, it is difficult to multiplex a private stream such as data stream for example except when the buffer model of the stream is already known.

Also, the conventional bit rate changer shown in FIG. 1 has a problem that it can change the bit rate of a transport stream TS having multiplexed therein one video stream VS and one audio stream AS, each conforming to MPEG-2 but cannot change the bit rate of a TS having multiplexed therein one video stream VS and a plurality of audio streams AS.

DISCLOSURE OF THE INVENTION

Accordingly, the present invention has an object to overcome the above-mentioned drawbacks of the prior art by enabling to separate an input TS containing any elementary streams not conforming to MPEG-2 into elementary streams and re-multiplex the elementary streams.

The present invention has another object to permit to change the bit rate of a TS having multiplexed therein a plurality of elementary streams besides video streams.

The above object can be attained by providing a transcoder for generating, from a first multiplexed stream, a second multiplexed stream, including according to the present invention:

means for separating a first elementary stream from the first multiplexed stream supplied;

means for converting the first elementary stream separated by the separating means by a predetermined method to a signal;

means for packetizing the signal converted by the converting means to generate a first packet;

means for storing timing information indicating a time at which a packet, containing a second elementary stream forming the first multiplexed stream, appears in the multiplexed stream; and means for multiplexing, based on the timing information stored in the storing means, the first packet generated by the packetizing means and a second packet containing the second elementary stream to generate the second multiplexed stream.

In the above transcoder according to the present invention, the converting means includes:

means for decoding the first elementary stream separated by the separating means to generate an original signal corresponding to the first elementary stream; and means for encoding the original signal generated by the decoding means at a predetermined bit rate.

Also in the above transcoder, the converting means converts, by a predetermined method, codes forming the first elementary stream separated by the separating means.

Also in the above transcoder, the multiplexing means multiplexes, based on the timing information stored in the storing means, the second packet to the second multiplexed stream at a time corresponding to the time at which the second packet appears in the first multiplexed stream.

Also the above object can be attained by providing a transcoding method for generating, from a first multiplexed stream, a second multiplexed stream, including, according to the present invention, steps of:

separating a first elementary stream from the first multiplexed stream supplied;

converting the first elementary stream separated at the separating step by a predetermined method to a signal;

packetizing the signal converted at the converting step to generate a first packet;

storing timing information indicating a time at which a packet, containing a second elementary stream forming the first multiplexed stream, appears in the multiplexed stream; and multiplexing, based on the timing information stored at the storing step, the first packet generated at the packetizing step and a second packet containing the second elementary stream to generate the second multiplexed stream.

In the above transcoding method according to the present invention, the converting step includes steps of:

decoding the first elementary stream separated at the separating step to generate an original signal corresponding to the first elementary stream; and encoding the original signal generated at the decoding step at a predetermined bit rate.

Also in the above transcoding method, at the converting step, codes forming the first elementary stream separated at the separating step are converted by a predetermined method.

Also in the above transcoding method, at the multiplexing step, the second packet is multiplexed to the second multiplexed stream at a time corresponding to the time at which the second packet appears in the first multiplexed stream based on the timing information stored at the storing step.

Also the above object can be attained by providing a medium having recorded therein a transcoding program to generate, from a first multiplexed stream, a second multiplexed stream and which is to be executed by a computer, the program including, according to the present invention, steps of:

separating a first elementary stream from the first multiplexed stream supplied;

converting the first elementary stream separated at the separating step by a predetermined method to a signal;

packetizing the signal converted at the converting step to generate a first packet;

storing timing information indicating a time at which a packet, containing a second elementary stream forming the first multiplexed stream, appears in the multiplexed stream; and multiplexing, based on the timing information stored at the storing step, the first packet generated at the packetizing step and a second packet containing the second elementary stream to generate the second multiplexed stream.

In the above medium according to the present invention, the converting step in the program includes steps of:

decoding the first elementary stream separated at the separating step to generate an original signal corresponding to the first elementary stream; and encoding the original signal generated at the decoding step at a predetermined bit rate.

Also in the above medium, at the converting step in the program, codes forming the first elementary stream separated at the separating step are converted by a predetermined method.

Also in the above medium, at the multiplexing step in the program, the second packet is multiplexed to the second multiplexed stream at a time corresponding to the time at which the second packet appears in the first multiplexed stream based on the timing information stored at the storing step.

These objects and other objects, features and advantages of the present invention will become more apparent from the following detailed description of the preferred embodiments of the present invention when taken in conjunction with the accompanying drawings.

BEST MODE FOR CARRYING OUT THE INVENTION

Figure 2:
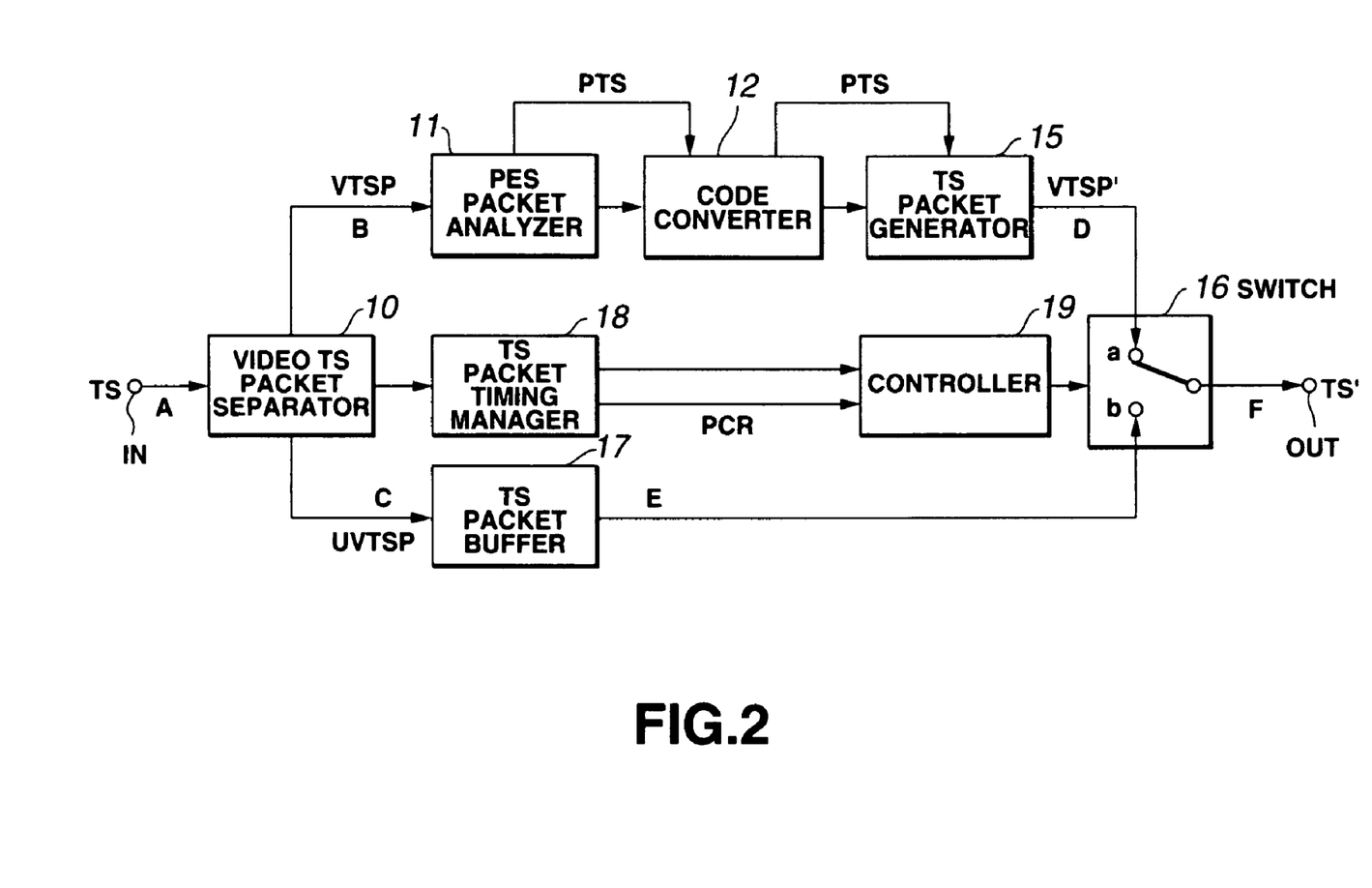
FIG. 2 is a block diagram of an embodiment of the transcoder according to the present invention.

Referring now to FIG. 2, there is illustrated in the form of a block diagram an embodiment of the transcoder according to the present invention. This transcoder is to generate, from a first transport stream TS supplied as an input, a second transport stream TS'. The first transport stream TS is a one having multiplexed therein a video signal transport stream packet as a first elementary stream (will be referred to as "video TS packet VTSP" hereinafter) and non-video TS packets UVTSP including audio stream and other data stream.

As shown in FIG. 2, the transcoder includes a video TS packet separator 10 to separate the video TS packet VTSP from the first transport stream TS supplied from an input terminal IN, a code converter 12 to convert, by a predetermined method, codes forming the video TS packet VTSP separated by the video TS packet separator 10, a TS packet generator 15 to generate a code-converted video TS packet VTSP' by packetizing the signal whose codes have been converted by the code converter 12, a TS timing manager 18 to store timing information indicating a time at which the packet including the non-video TS packets UVTSP forming the first transport stream TS appears in the first transport stream TS, and a switch 16 to generate, and deliver at an output terminal OUT, the second transport stream TS' by multiplexing the video TS packet VTSP' generated by the TS packet generator 15 and non-video TS packet UVTSP based on the timing information stored in the TS packet timing manager 18. The switch 16 functions as a multiplexer under the control of a controller 19 which will further be described later.

The transcoder further includes a PES packet analyzer 11 provided between the video TS packet separator 10 and code converter 12, the controller 19 provided between the TS packet timing manager 18 and switch 16, and a TS packet buffer 17.

The video TS packet separator 10 extracts a video TS packet VTSP from the first transport stream TS supplied from the input terminal IN, and provides it to the PES packet analyzer 11. Also, the video TS packet separator 10 extracts, from the first transport stream TS, the non-video TS packet UVTSP and provides it to the TS packet buffer 17. Further, the video TS packet separator 10 supplies the TS packet timing manager 18 with timing information indicating a time at which the non-video TS packet UVTSP has been supplied as an input (information indicating a time at which the non-video TS packet appears in the first transport stream TS).

The PES packet analyzer 11 uses the pay load of the video TS packet VTSP supplied from the video TS packet separator 10 to form a PES (packetized elementary stream) and provides the coder converter 12 with a encoded video signal being the pay load of the PES packet (will be referred to as "encoded video signal" hereinafter). Also the PES packet analyzer 11 provides the code converter 12 with a PTS (presentation time stamp) of the encoded video signal. Note here that the PTS is a parameter described in the header of the PES packet and indicates a time on the time base when the encoded video signal is to be reproduced.

The code converter 12 converts, by the predetermined method, the encoded video signal generated by the PES packet analyzer 11 from the video TS packet VTSP separated by the video TS packet separator 10. For example, when the transcoder is used as a bit rate converter shown in FIG. 1, the code converter 12 decodes the encoded video signal, then re-encodes it at a predetermined bit rate (compression rate) and supplies it to the TS packet generator 15. Also, the transcoder may convert codes concerning copyright protection information, for example, appended to the encoded video signal.

Figure 3:
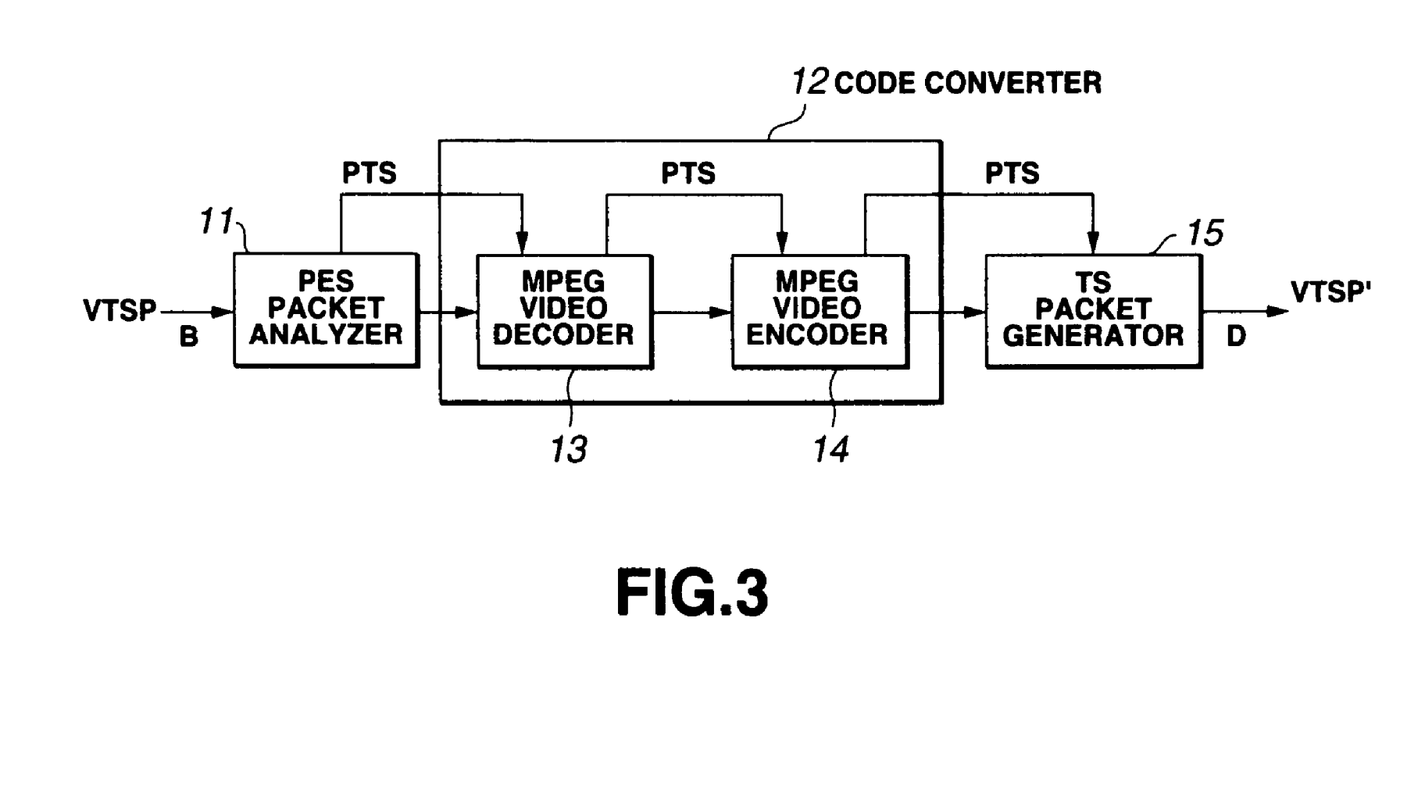
FIG. 3 is a block diagram of a code converter included in the transcoder in FIG. 2.

First, bit rate conversion will be described below. In this case, the code converter 12 includes an MPEG video decoder 13 and MPEG video encoder 14 as shown in FIG. 3. The MPEG video decoder 13 decodes the encoded video signal supplied from the PES packet analyzer 11, and provides the decoded video signal to the MPEG video encoder 14. The MPEG video decoder 13 will also provide the MPEG video encoder 14 with a PTS (presentation time stamp) corresponding to the video signal. The MPEG video encoder 14 re-encodes, at a predetermined bit rate (compression rate), the video signal supplied from the MPEG video decoder 13, and provides the TS packet generator 15 with the re-encoded video signal along with a PTS corresponding to the re-encoded video signal. Under the control of the controller 19, the TS packet generator 15 packetizes the encoded video signal supplied from the MPEG video encoder 14 to generate a video TS packet VTSP', and delivers it at an input terminal a of the switch 16.

The switch 16 is controlled by the controller 19 to turn the output thereof to either the input terminal a or b thereof. The switch 16 will provide, via the output terminal OUT, either the video TS packet VTSP' supplied to the input terminal a thereof from the TS packet generator 15 or the second packet stream TS' generated by time-division multiplexing the non-video TS packets UVTSP, supplied at the input terminal b thereof from the TS packet buffer 17.

The TS packet buffer 17 stores non-video TS packets UVTSP supplied from the video TS packet separator 10 and delivers them one after another at the input terminal b of the switch 16.

The TS packet timing manager 18 manages timing information supplied from the video TS packet separator 10 and corresponding to the non-video TS packet UVTSP, stored in the TS packet buffer 17 (information indicating a time at which the TS packet UVTSP appears in the TS) and a PCR (program clock reference) indicating a time on the time base of the TS, and supplies them to the controller 19.

The controller 19 controls the TS packet generator 15 and switch 16 based on the timing information and PCR supplied from the TS packet timing manager 18.

Figure 4:
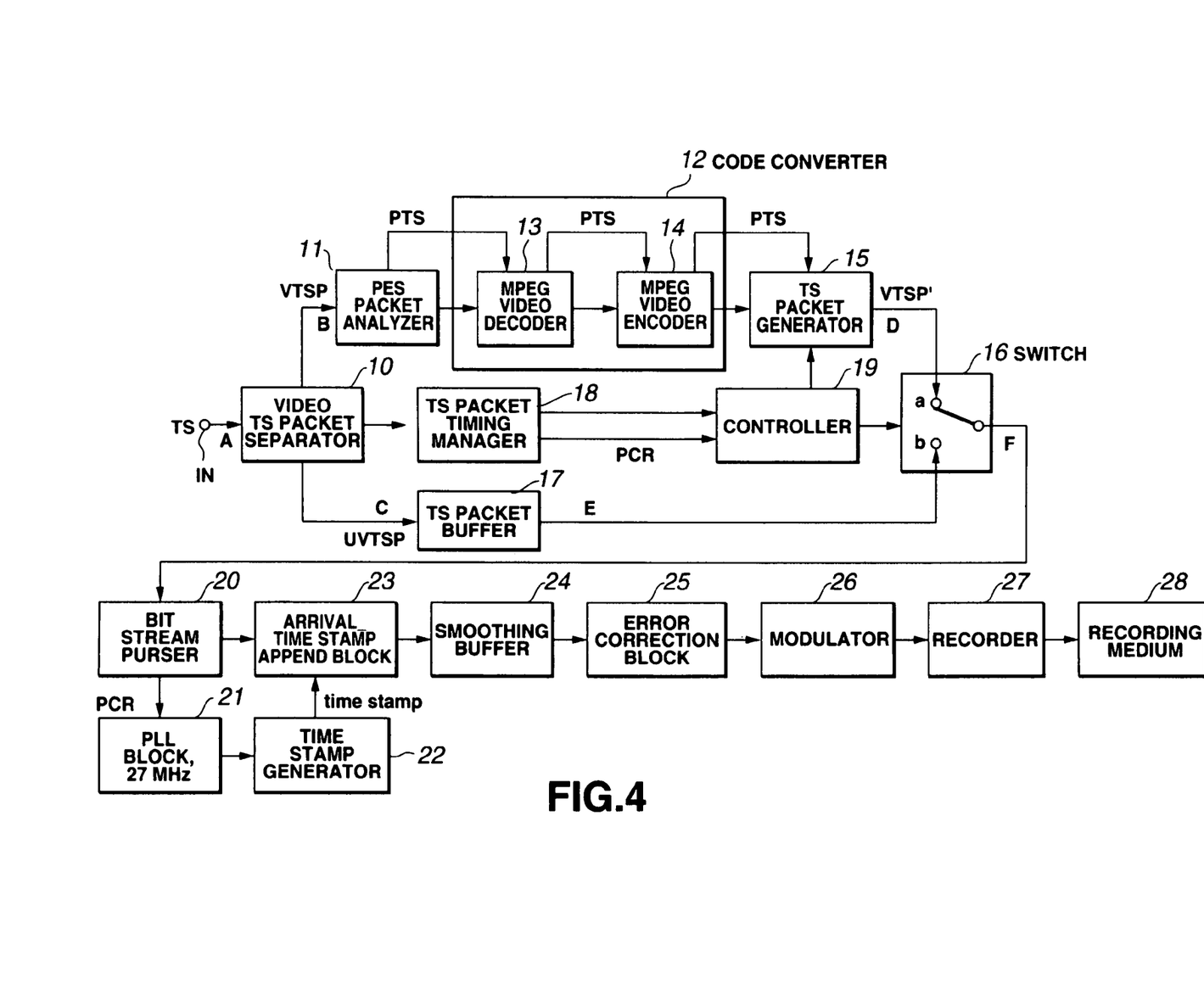
FIG. 4 is a block diagram of a TS recorder using the transcoder in FIG. 2, showing an example of its construction.

The transcoder constructed to convert a bit rate as in the above is used in a transport stream (TS) recorder shown in FIG. 4. The TS recorder records into a recording medium which will further be described later the second transport stream TS' generated by multiplexing the video TS packet VTSP' whose bit rate has been reduced by the code converter 12 of the transcoder, and non-video TS packet UVTSP.

The TS recorded shown in FIG. 4 includes a transcoder as shown in FIG. 1 and a recording system including a bit stream purser 20 to recording medium 28.

The bit stream purser 20 reads a PCR from TS packets supplied one after another from the switch 16 and provides them to a PLL (phase locked loop) block 21 and other to an Arrival_time stamp append block 23. The PLL block 21 locks a 27-MHz clock of the recording system to the PCR supplied from the bit stream purser 20. The recording system also includes a time stamp generator 22 which generates a time stamp based on a count of 27-MHz clocks.

When providing a TS packet supplied from the bit stream purser 20 to a smoothing buffer 24 also included in the recording system, the Arrival_time stamp append block 23 appends to the TS packet a time stamp indicating a time at which a first byte of the TS packet is to be provided to the smoothing buffer 24. The smoothing buffer 24 stores the TS packet having the time stamp appended thereto, and provides it in units of a predetermined data amount appropriately to an error correction block 25 also included in the recording system. The error correction block 25 appends an error correction code to the TS packet supplied from the smoothing buffer 24 and provides it to a modulator 26 also included in the recording system. The modulator 26 modulates the TS packet supplied from the error correction block 25 by a predetermined method, and provides it to a recorder 27 also included in the recording system. The recorder 27 records the modulated TS packet supplied from the modulator 27 to the recording medium 28.

The transcoder used in the TS recorder functions as will be described below with reference to FIG. 5. Note that actually, TS packets shown in FIG. 5D are delayed relative to TS packets shown in FIGS. 5A to 5C for time lengths of the operations of the PES packet analyzer 11 to TS packet generator 15. The non-video TS packets UVTSP are buffered in the TS packet buffer 17 and provided at an appropriate time (as shown in FIG. 5E) to synchronize these TS packets at each time indicated with a broken line in FIG. 5.

Figure 5:
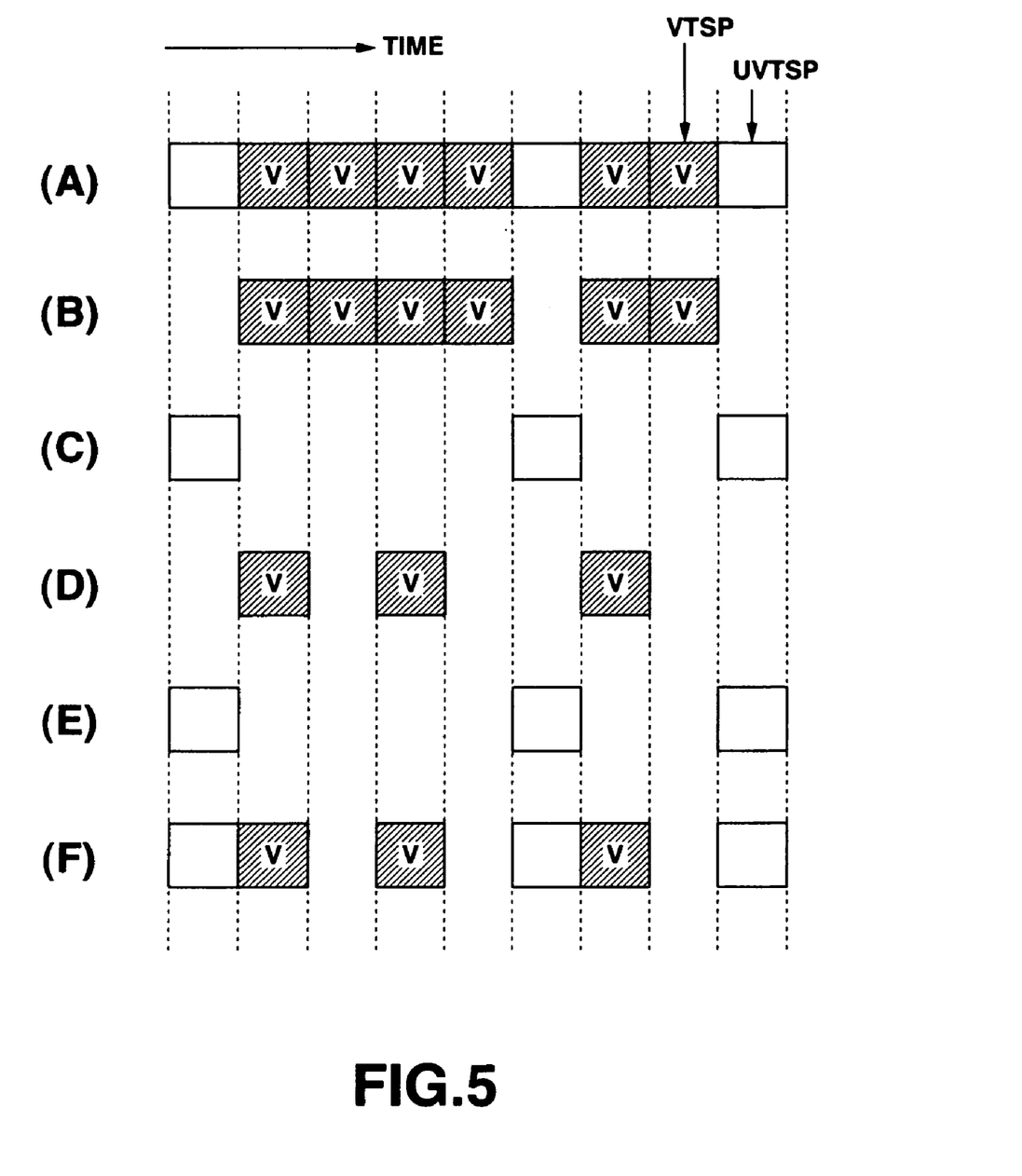
FIG. 5 explains the operation of the TS recorder in FIG. 4.

When a TS having time-division multiplexed therein video TS packets VTSP (indicated with "V" in FIG. 5) shown in FIG. 5A and non-video TS packets UVTSP, is supplied from the video TS packet separator 10 to the video TS packet separator 10, the latter will extract the video TS packets VTSP from the TS as shown in FIG. 5B, and provide them to the PES packet analyzer 11. The video TS packet separator 10 will also extract the non-video TS packets UVTSP from the TS as shown in FIG. 5C, and provide them to the TS packet buffer 17. At the same time, the video TS packet separator 10 will provide the TS packet timing manager 18 with information of a time at which the non-video TS packet UVTSP has been supplied.

The PES packet analyzer 11 uses the pay load of the video TS packet VTSP' supplied from the video TS packet separator 10 to provide a PES packet, and provides an encoded video signal being the pay load to the MPEG video decoder 13 in the code converter 12. The MPEG video decoder 13 decodes the encoded video signal supplied from the PES packet analyzer 11, and provides the decoded video signal to the MPEG video encoder 14.

The MPEG video encoder 14 re-encodes the video signal supplied from the MPEG video decoder 13 at a predetermined bit rate (half of the bit rate of the TS packets shown in FIG. 5B when the video signal is the TS packets shown in FIG. 5D), and provides it, along with PTS to which the encoded video signal corresponds, to the TS packet generator 15. Under the control of the controller 19, the TS packet generator 15 packetizes the encoded video signal from the MPEG video encoder 14 as shown in FIG. 5D, and provides it to the input terminal a of the switch 16.

On the other hand, the TS packet buffer 17 supplies the non-video TS packets to the input terminal b of the switch 16 with a delay of a predetermined time as shown in FIG. 5E.

Figure 6:
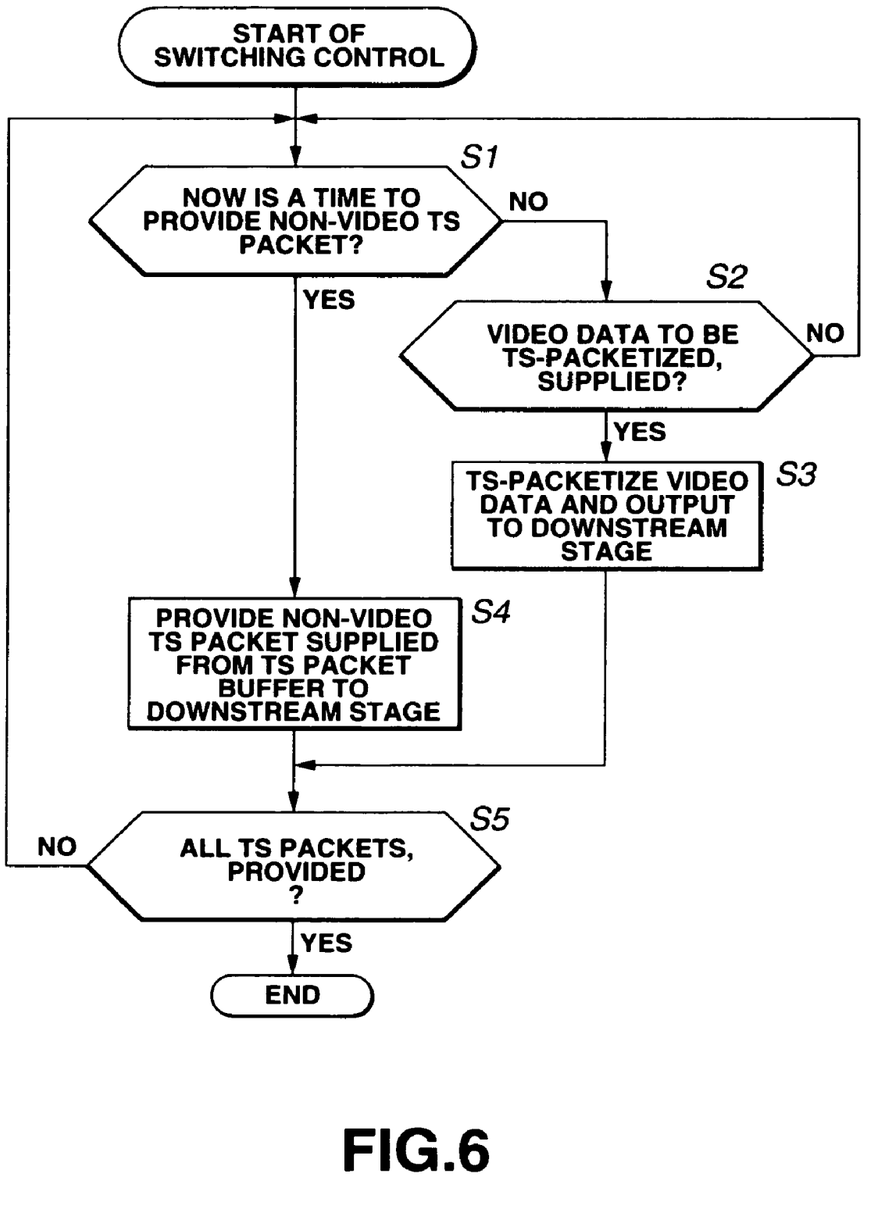
FIG. 6 is a flow chart of operations effected in switching control by a controller included in the transcoder in FIG. 2.

The controller 19 controls the switch 16 to turn the output thereof to its input terminal a or b (as will further be described later with reference to the flow chart of FIG. 6).

Thus, the video TS packets VTSP' and non-video TS packets UVTSP are time-division multiplexed as shown in FIG. 5F are provided from the switch 16 to the bit stream purser 20 located downstream of the switch 16.

The TS packets not continuous to each other as shown in FIG. 5F will be rearranged to be close to each other by the downstream smoothing buffer 24 in the recording system shown in FIG. 4 and then recorded in the recording medium 28.

Next, the switching by the controller 19 will be described herebelow with reference to the flow chart in FIG. 6. First at step S1, the controller 19 judges, based on the timing information and PCR supplied from the TS packet timing manager 18, whether the present time (elapsed from a time when the video TS packet separator 10 was supplied with TS) is a time to provide non-video TS packets UVTSP on the time base of the TS. If it determines that now is not any time to provide the non-video TS packet UVTSP, it goes to step S2.

At step S2, the controller 19 judges whether the TS packet generator 15 has been supplied with an encoded video signal to be TS-packetized from the MPEG encoder 14. If it determines that the encoded video signal to be TS-packetized is not supplied, it goes to step S3.

At step S3, the TS packet generator 15 will be controlled by the controller 19 to packetize the encoded video signal from the MPEG video encoder 14 and provide it to the input terminal a of the switch 16. The switch 16 will be controlled by the controller 19 to turn an output thereof to the input terminal a and provide the video TS packet VTSP' supplied from the TS packet generator 15 to the downstream bit stream purser 20 shown in FIG. 4.

At step S5, the controller 19 judges whether all TS packets have been provided to the stage downstream of the switch 16. If it determines that all the TS packets have not yet been provided, it goes back to step S1.

If it is determined at step S1 that the present time is a time to provide the non-video TS packet UVTSP, the controller 19 will go to step S4. At step S4, the switch 16 is controlled by the controller 19 to turn the output thereof to the input terminal b and provide the non-video TS packet UVTSP supplied from the TS packet buffer 17 to the bit stream purser 20 located downstream of the switch 16.

Thereafter, the controller 19 will go back to step S1 until it determines at step S5 that all the TS packets have been provided, and the operations at steps S1 and subsequent steps are repeated. When the controller 19 determines that all the TS packets have been provided, the switching control will be ended.

As in the above, the transcoder functioning to convert a bit rate can convert only the bit rate of video streams contained in a TS to generate a new TS whether or not non-video elementary streams, contained in the TS are conforming to MPEG-2.

Also the transcoder can convert the bit rate of video streams contained in a TS irrespectively of the number of non-video elementary streams contained in the TS to generate a new TS.

The TS recorder can convert only the bit rate of video streams contained in a TS to generate and record a new TS whether or not non-video elementary streams contained in the TS are conforming to MPEG-2.

Also the TS recorder can convert the bit rate of video streams contained in a TS irrespectively of the number of non-video elementary streams to generate and record a new TS.

Note that the present invention is applicable to decoding of a video bit stream forming an input multiplexed stream to generate an original signal, and re-encoding of the original signal to convert the bit rate of the video bit stream forming the input multiplexed stream as well as to converting of codes appended to the video bit stream by a predetermined method, re-appending the converted code to the video bit stream and providing them.

Figure 7:
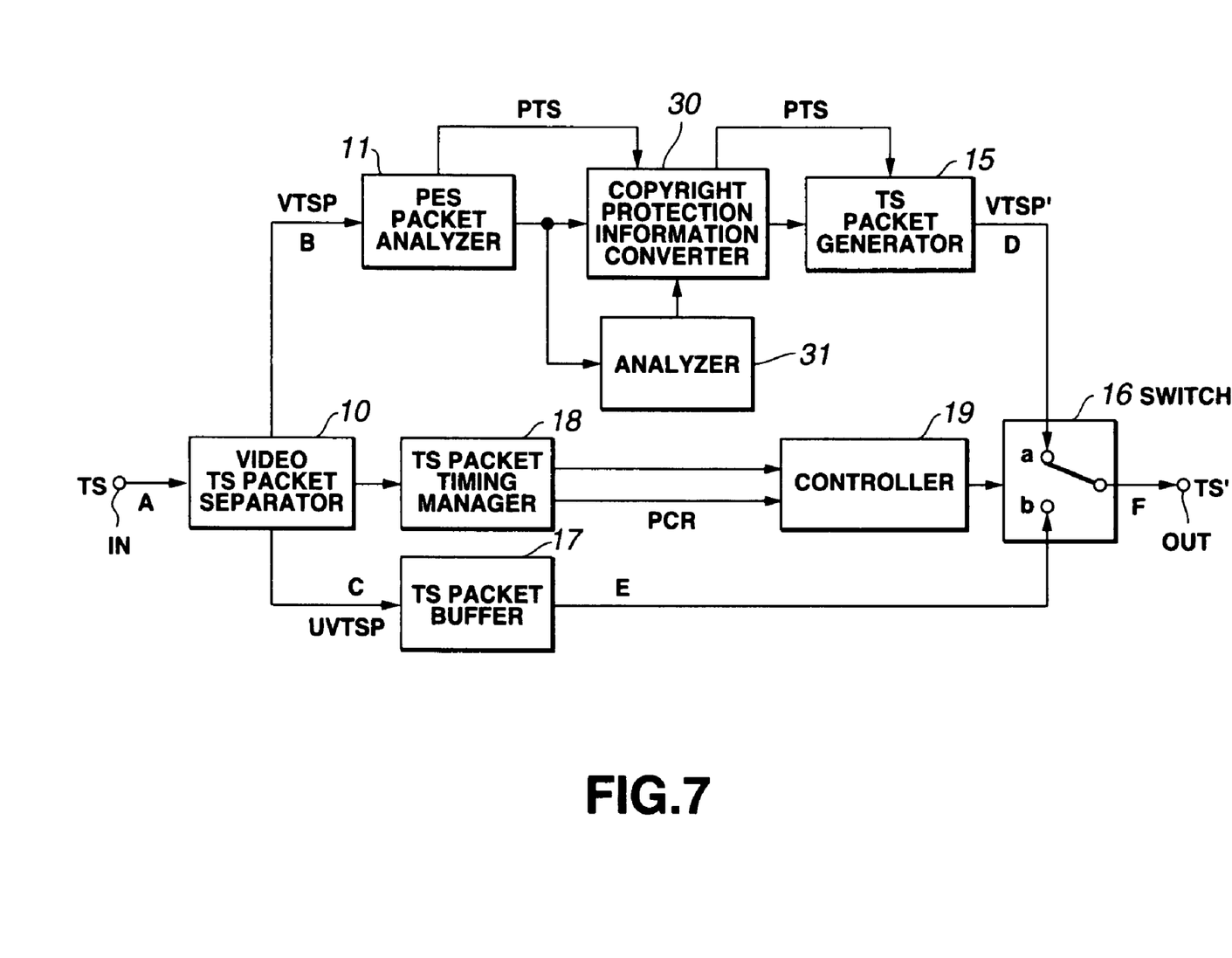
FIG. 7 is a block diagram of another embodiment of the transcoder according to the present invention.

For example, the present invention is applicable to conversion by a predetermined method of a code concerning a copyright protection information appended to a video bit stream forming an input multiplexed stream as shown in FIG. 7. The transcoder in FIG. 7 is different from that shown in FIG. 2 in that a copyright protection information converter 30 is used instead of the code converter 12 in FIG. 12, the output of the PES packet analyzer 11 is analyzed by an analyzer 31 and code conversion in the copyright protection information converter 30 is controlled according to the result of analysis from the analyzer 31.

The analyzer 31 analyzes the output of the PES packet analyzer 11 to detect copyright protection information such as copy control information (CCI), water mark signal, duplication generation information limiting the number of duplications, etc. embedded in an input video signal. The copyright protection information converter 30 updates, based on the result of analysis from the analyzer 31, codes concerning the copyright protection information by a predetermined method and provides an updated video stream.

For example, when the analyzer 31 detects duplication generation information, the copyright protection information converter 30 will count up the duplication generation information by one, if the generation limitation is within an allowable range, append the count to the video transport packet VTSP correspondingly to the PTS, and send the packet to the TS packet generator 15.

On the other hand, when the generation limitation is beyond the allowable range, the copyright protection information converter 30 will not provide the video TS packet VTSP to the TS packet generator 15.

Thus, the transcoder shown in FIG. 7 can provide a management to protect the copyright of the video transport stream.

The transcoder shown in FIG. 7 may be combined with the recording system including the bit stream purser 20 thru the recording medium 28 shown in FIG. 4 to construct a TS recorder which will record TS including a video stream whose copyright is protected. Note that the TS recorder cannot record any TS depending upon the type of the copyright protection information, for example, when the generation limitation is beyond the allowable range.

Note that the present invention is applicable to conversion of the bit rate of a video stream included in a program stream or to conversion of a code appended to a video bit stream by a predetermined method.

Also the present invention is applicable to conversion of the bit rate of an audio stream in an TS or conversion of an audio stream in a TS by a predetermined method, and then multiplexing the audio stream with other elementary stream to generate a new TS.

Further the present invention is applicable to conversion of the bit rate of a plurality of elementary streams such as both a video stream and audio stream or conversion of a plurality of elementary streams by a predetermined method, and then multiplexing them with other elementary stream to generate a new TS.

The aforementioned series of processes can be executed by a hardware and also by a software. For execution of the series of processes by a software, a program forming the software is installed in a computer built in a TS recorded as a dedicated hardware, or a general-purpose personal computer capable of performing a variety of functions with a variety of programs corresponding to the programs installed therein.

The medium according to the present invention having recorded therein a program intended for execution of the above series of processes and which is to be installed in a general-purpose personal computer which can execute the program, will be described herebelow with reference to FIGS. 8A to 8C.

Figure 8A:
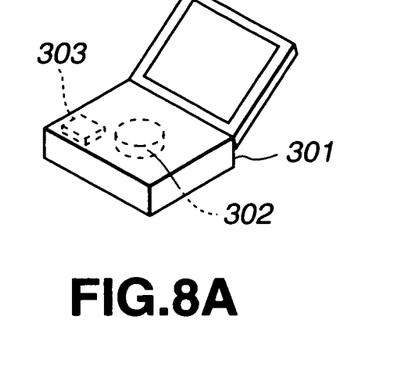
FIG. 8A shows a personal computer incorporating a recording medium having stored therein a transcoding program.

The program can be provided to the user as being previously installed in a hard disc 302 or semiconductor memory 303, as a recording medium, incorporated in a personal computer 301, as shown in FIG. 8A.

Figure 8B:
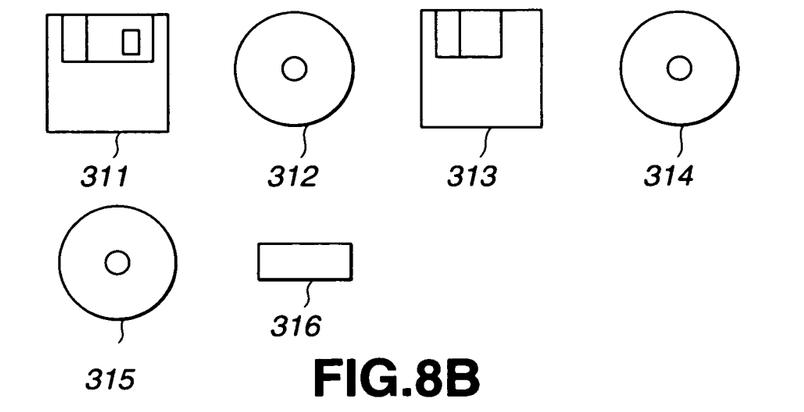
FIG. 8B explains the recording medium used to install the transcoding program into the personal computer and enable the execution of the program.

Alternatively, the program can be provided to the user as a package software as being provisionally or permanently stored in a recording medium such as a floppy disc 311, CD-ROM (compact disc-read-only memory) 312, MO (magneto-optical) disc 313, DVD (digital versatile disc) 314, magnetic disc 315 or semiconductor memory 316, as shown in FIG. 8B.

Figure 8C:
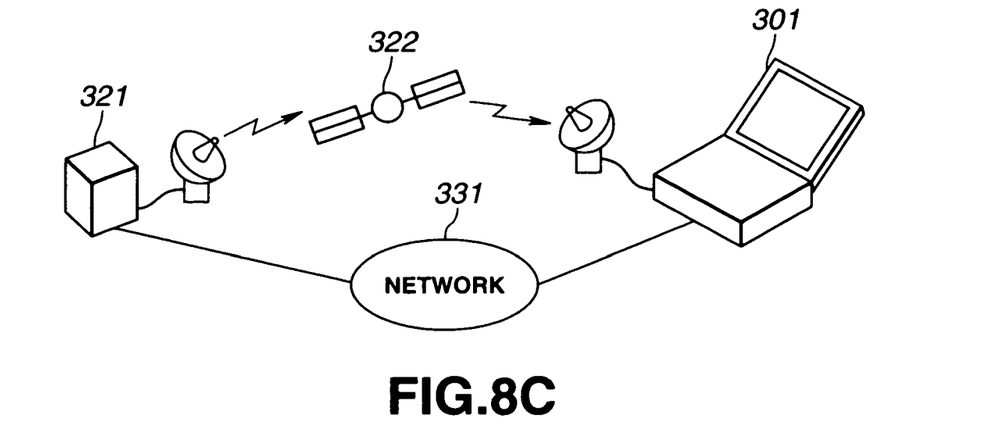
FIG. 8C explains a system used to install the transcoding program into the personal computer and enable the execution of the program.

Further, as shown in FIG. 8C, the program can be transferred by radio to the personal computer 301 from a download site 321 via a satellite 322 or by cable or radio to the personal computer 301 from the download site 321 via a network 331 such as local area network (LAN) or Internet, and stored in the hard disc 302 or the like incorporated in the personal computer 301.

The term "medium" referred to herein means a broad concept including all these media.

Figure 9:
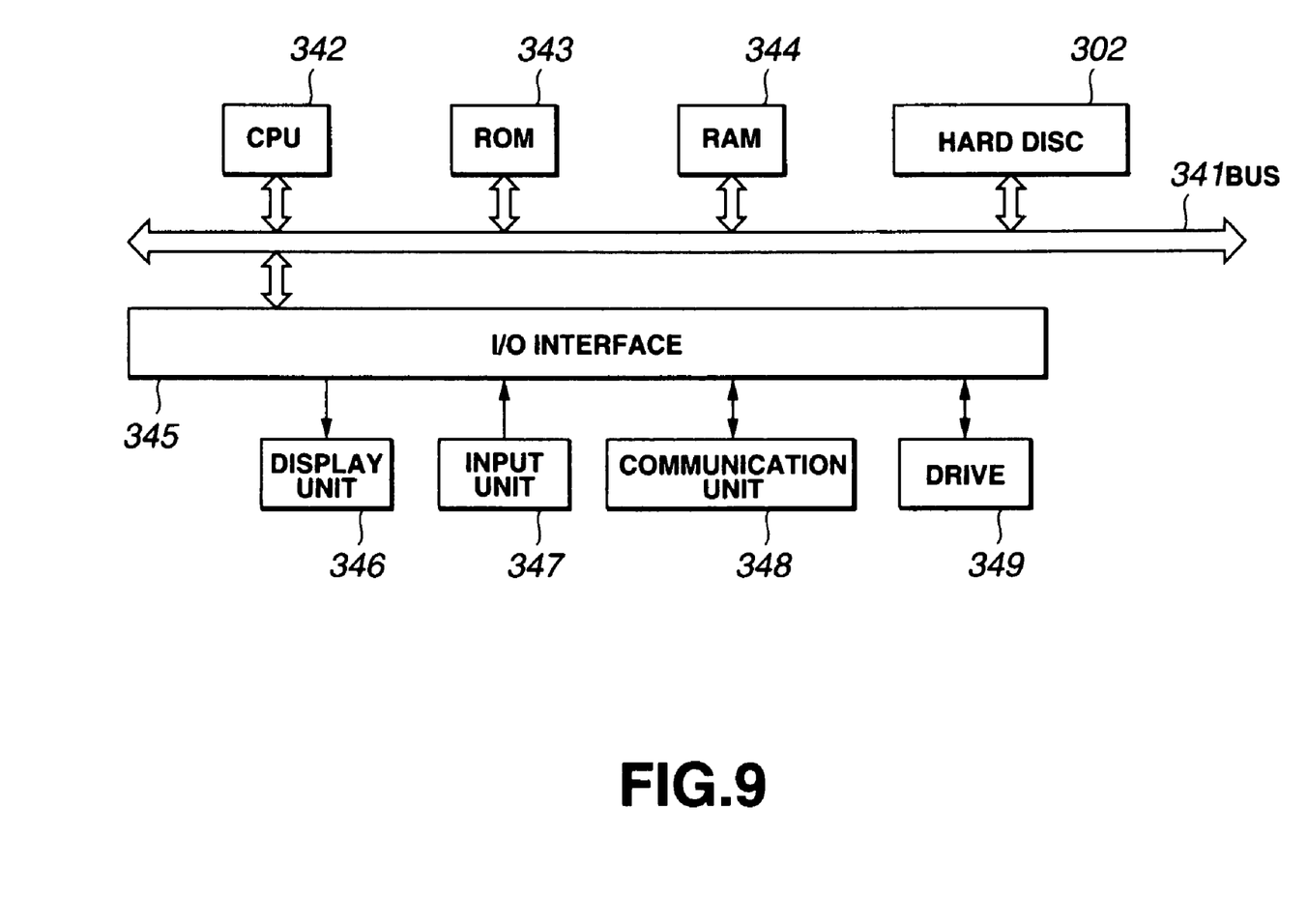
FIG. 9 is a block diagram of the personal computer, showing its internal construction.

The personal computer 301 incorporates a CPU (central processing unit) 342 as shown in FIG. 9 for example. The CPU 342 has an input/output interface 345 connected thereto via a bus 341. When supplied with a user's command via the input/output interface 345 from an input unit 347 including a keyboard, mouse, etc., the CPU 342 responds to the command to load into a RAM (random access memory) 344, and execute, a program stored in an ROM (read-only memory) 343 corresponding to the semiconductor memory 303 shown in FIG. 8A, a program transferred from the satellite 322 or network 331, received by the communication unit 348 and installed in the hard disc 302, or a program read out from the floppy disc 311, CD-ROM 312, MO disc 313, DVD 314 or magnetic disc 315 loaded in a drive 349 and installed in the hard disc 302. Further, the CPU 342 provides a result of a process executed thereby to a display unit 346 made of a LCD (liquid crystal display) or the like as necessary via the input/output interface 345 for example.

Note that in this specification, steps of describing the program provided to the user as stored in the medium include processes effected in a time series in the described order as well as processes effected in parallel or individually.

Note that the term "system" referred to herein means an entire assembly of a plurality of units.

INDUSTRIAL APPLICABILITY

As having been described in the foregoing, according to the present invention, a first elementary stream is code-converted to generate a first packet. Also, timing information indicating a time at which a second packet forming a second elementary stream appears in a multiplexed stream is stored. The generated first packet and second packet are multiplexed based on the timing information, so the code of only the first elementary stream can be converted to generate a new second multiplexed stream whether or not the second elementary stream is conforming to MPEG-2. Also, it is possible to convert the codes of a TS having multiplexed therein a plurality of elementary streams in addition to video streams.

The invention claimed is:

1. A transcoding apparatus transcoding a first video stream into a second video stream, comprising:
   a separator to extract a video transport stream packet including the first video stream, a non-video transport stream packet, and timing information from a first transport stream, the timing information indicating a time at which the non-video transport stream packet is formed in the first transport stream relative to the video transport stream packet;
   a memory to store the timing information;
   a conversion unit to generate the second video stream based on the first video stream; and
   a multiplexer to multiplex a converted video transport stream packet including the second video stream and a converted non-video transport stream packet based on the stored timing information to generate a second transport stream, including the second video stream, wherein
   the conversion unit is provided with a presentation time stamp of an encoded video signal, the presentation time stamp being necessary for reproduction of the encoded video signal and independent of timing relative to packet positioning in the second transport stream.

2. The transcoding apparatus as set forth in claim 1, wherein the second video stream is generated by re-encoding the first video stream.

3. The transcoding apparatus as set forth in claim 1, wherein the second video stream is generated by reducing a bit rate of the first video stream.

4. The transcoding apparatus of claim 1, further comprising:
   a time stamping unit to provide arrival time information into a second transport stream including the second video stream relative to a time of buffering prior to a recording operation of the transcoding apparatus.

5. A transcoding apparatus transcoding a first video stream into a second video stream, comprising:
   means for extracting a video transport stream packet including the first video stream, a non-video transport stream packet, and timing information from a first transport stream, the timing information indicating a time at which the non-video transport stream packet is formed in the first transport stream relative to the video transport stream packet;

means for storing the timing information;

means for generating the second video stream based on the first video stream; and means for multiplexing a converted video transport stream packet including the second video stream and a converted non-video transport stream packet based on the stored timing information to generate a second transport stream, including the second video stream, wherein the means for generating is provided with a presentation time stamp of an encoded video signal, the presentation time stamp being necessary for reproduction of the encoded video signal and independent of timing relative to packet positioning in the second transport stream.

6. The transcoding apparatus of claim 5, further comprising:

a time stamping unit to provide arrival time information into a second transport stream including the second video stream relative to a time of buffering prior to a recording operation of the transcoding apparatus.

7. A method of transcoding a first video stream into a second video stream at a transcoding apparatus, comprising:

extracting a video transport stream packet, at the transcoding apparatus, including the first video stream, a non-video transport stream packet, and timing information from a first transport stream, the timing information indicating a time at which the non-video transport stream packet is formed in the first transport stream relative to the video transport stream packet;

storing the timing information in a memory of the transcoding apparatus;

generating the second video stream based on the first video stream, including the second video stream, at the transcoding apparatus; and multiplexing a converted video transport stream packet including the second video stream and a converted non-video transport stream packet based on the stored timing information to generate a second transport stream at the transcoding apparatus, wherein the generating is provided with a presentation time stamp of an encoded video signal, the presentation time stamp being necessary for reproduction of the encoded video signal and independent of timing relative to packet positioning in the second transport stream.

8. The method of claim 7, wherein the second video stream is generated by re-encoding the first video stream.

9. The method of claim 7, wherein the second video stream is generated by reducing a bit rate of the first video stream.

10. The transcoding method of claim 7, further comprising:

providing arrival time information into a second transport stream including the second video stream relative to a time of buffering prior to a recording operation of the transcoding apparatus.

* * * * *